Patented Sept. 20, 1932

1,877,779

UNITED STATES PATENT OFFICE

ERNST TEUPEL, OF DORMAGEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ALKYL CELLULOSE ESTERS

No Drawing. Application filed January 11, 1929, Serial No. 331,952, and in Germany January 20, 1928.

The present invention relates to a process of preparing alkyl-cellulose esters and to new products obtainable thereby.

Acyl celluloses employed on a technical scale, such as acetyl-, propionyl-, and butyryl celluloses, are prepared by the reaction upon cellulose, for instance, cotton and wood cellulose, of the respective fatty acid anhydride in the presence of a catalyst, such as sulfuric acid, zinc chloride and thionylchloride, or mixtures of these catalysts. The quantity of the catalyst required is rather large, for example, in using sulfuric acid as catalyst, about 5% to about 20%, calculated on the amount of the cellulose, must be added, and when zinc chloride is used, up to 70% are required. Furthermore, as the acylation requires a long time, say 8 to 10 hours, the cellulose is partially hydrolized, whereby the properties of the acyl cellulose formed are unfavorably influenced.

In preparing acetyl cellulose, at first a triacetate is obtained, which is without technical value, because it is insoluble in the usual solvents; in order to obtain a soluble product, the triacetate is partially saponified to form a product containing 2½ acetyl groups as substituents. If the quantity of the catalyst is reduced, the acetyl cellulose gelatinizes before the acetylation is finished, and a product is obtained which is without techincal value.

Now I have found, that alkylated celluloses, being substituted by lower alkyl radicles for example, methyl and ethyl celluloses, containing about ½ to about 1½ alkyl groups, calculated on the molecule $C_6H_{10}O_5$,—said alkyl celluloses being soluble in water and alkalies, (those containing 1½ alkyl groups being swelled up), and being soluble in organic solvents, such as pyridine and glacial acetic acid—can easily be acylated. In these cellulose ethers, the unetherified hydroxy groups are rendered more reactive, and the acylation can be performed with a small part of the quantity of the catalyst heretofore used, 0.1% to about 3% of sulfuric acid being sufficient, and the best results being obtained with about 0.1% to about 0.5%. In using zinc chloride, about 10% to about 30% is sufficient. Besides, the acylation is finished in about a tenth to about a quarter of the time heretofore required, that means in about one to about two hours.

The starting material used in my process is prepared by alkylating the cellulose in the usual manner; for example, in preparing methyl cellulose, alkali cellulose is treated with methyl sulfate. The acylation of the alkyl celluloses is carried out in the usual manner of acylating cellulose, for example by treating the same in a solvent, such as glacial acetic acid, with the anhydride of the fatty acid to be introduced into the molecule, in the presence of an acylation catalyst.

In the new alkyl cellulose esters, 2½ hydroxy groups (calculated on the molecule $C_6H_{10}O_5$) are substituted, and as the starting material contains ½ to 1½ alkyl groups, the new products contain 2 to 1 acyl groups, that means, according to my process, products are obtained, wherein the proportion of the alkyl groups to the acyl groups is about ½ : 2, or about 1 : 1½, or about 1½ : 1.

In carrying out my process, it is not necessary to start with a uniformly alkylated cellulose, but mixtures of alkyl celluloses may be used.

My new substances are highly to slightly viscous substances, insoluble in water, soluble in acetone, aceto acetic ester, chlorinated hydrocarbons, such as chloroform, dichloromethylene, in a mixture of alcohol and benzene, and other solvents. The highly viscous products yield elastic, solid films, while the slightly viscous alkyl cellulose esters are suitable substances for the manufacture of lacquers.

The properties of the new alkyl cellulose esters depend somewhat on the relation of the alkyl groups to the acyl groups in the molecule, for example, a cellulose, containing ½ alkyl and 2 acetyl groups, shows properties similar to those of the normal acetyl cellulose. Besides, the quantity of the catalyst and the time, in which the process is carried out, influence the properties of the new compounds, small quantities of the catalyst and a short time produce highly viscous substances, while a greater quantity of the catalyst and a longer time of reaction produce a substance which is less viscous.

The following examples will illustrate my invention, without limiting it thereto:

*Example 1.*—100 parts by weight of monoethylcellulose prepared from alkali cellulose and ethylhalogenide in the usual manner, said ethyl cellulose being soluble in cold water and solutions of strong alkalies, are introduced into a mixture of 300 parts by weight of glacial acetic acid, 200 parts by weight of butyric acid anhydride and 0.5 parts by weight of sulfuric acid and stirred for about 40 minutes, care being taken that the temperature does not exceed 50° C. A clear mass, free from fibers, is formed which is precipitated with water and washed free from acid. The new ethyl butyryl cellulose contains about 44% of the butyryl residue.

*Example 2.*—100 parts by weight of methyl cellulose, prepared from alkali cellulose and dimethyl sulfate, and containing 1 methyl group calculated on the molecule $C_6H_{10}O_5$, said methyl cellulose being soluble in ice water, are kneaded with 250 parts by weight of glacial acetic acid, 200 parts by weight of acetic acid anhydride and 0.25 parts by weight of sulfuric acid for about 1 hour. The methylacetyl cellulose is precipitated with water and washed. It is soluble in acetone, alcohol + benzene, dichloromethylene and is stable to water.

*Example 3.*—100 parts by weight of ethylcellulose, containing about 1½ ethyl groups in the molecule $C_6H_{10}O_5$, are kneaded with 500 parts by weight of glacial acetic acid, 100 parts by weight of acetic acid anhydride and 15 parts by weight of zinc chloride until a clear mass free from fibers has been formed. The new ethyl acetyl cellulose is precipitated with water and washed free from acid. It is soluble in acetone, acetic acid ester, dichloromethylene and is stable to water; 2.5 hydroxy groups are substituted.

I claim:

1. In the process of preparing alkyl acyl celluloses, the step which comprises acylating an alkyl cellulose, containing about ½ to about 1½ alkyl groups in the molecule $C_6H_{10}O_5$.

2. In the process of preparing alkyl acyl celluloses, the step which comprises acylating an alkyl cellulose of the group consisting of methyl and ethyl celluloses, containing about ½ to about 1½ alkyl groups in the molecule $C_6H_{10}O_5$.

3. In the process of preparing alkyl acyl celluloses, the step which comprises treating an alkyl cellulose of the group consisting of methyl and ethyl celluloses, containing about ½ to about 1½ alkyl groups in the molecule $C_6H_{10}O_5$, with an anhydride of a lower fatty acid having from 2 to 4 carbon atoms in glacial acetic acid and in the presence of an acid acylating catalyst for about 1 to 2 hours.

4. In the process of preparing alkyl acetyl celluloses, the step which comprises treating a methyl cellulose containing about ½ to about 1½ methyl groups in the molecule $C_6H_{10}O_5$ with acetic acid anhydride, in glacial acetic acid and in the presence of sulfuric acid.

5. In the process of preparing alkyl acetyl celluloses, the step which comprises treating a methyl cellulose with about ½ to about 1½ methyl groups in the molecule $C_6H_{10}O_5$ with acetic acid anhydride in glacial acetic acid and in the presence of about 0.1 to about 3% sulfuric acid.

6. In the process of preparing alkyl acetyl celluloses, the step which comprises treating 100 parts by weight of methyl cellulose, containing ½ methyl group in the molecule $C_6H_{10}O_5$, in 250 parts by weight of glacial acetic acid with 200 parts by weight of acetic anhydride and 0.5 parts by weight of sulfuric acid for about 1 hour.

7. As new products for making films, stable to water, and lacquers, alkyl cellulose esters containing 2½ alkyl + acyl groups in the molecule $C_6H_{10}O_5$, ½ to 1½ of these being alkyl groups, these products being highly to slightly viscous substances, insoluble in water, soluble in acetone, chlorinated hydrocarbons, mixtures of alcohol and benzene.

8. As new products for making films, stable to water, and lacquers, alkyl cellulose esters containing in the molecule substituents of the group consisting of the methyl-, ethyl-, acetyl-, propionyl- and butyryl groups, but ½ to 1½ being alkyl groups, these products being highly to slightly viscous substances, insoluble in water, soluble in acetone, chlorinated hydrocarbons, mixtures of alcohol and benzene.

9. As new products for making films, stable to water, and lacquers, methyl acetyl celluloses, containing in the molecule $C_6H_{10}O_5$ 2½ methyl + acetyl groups, ½ to 1½ of them being methyl groups, these products being highly to slightly viscous substances, insoluble in water, soluble in acetone, chlorinated hydrocarbons, mixtures of alcohol and benzene.

10. As a new product for making films which are stable to water, a methyl acetyl cellulose, containing ½ methyl group and 2 acetyl groups in the molecule $C_6H_{10}O_5$, this product being insoluble in water, soluble in acetone, chlorinated hydrocarbons, mixtures of alcohol and benzene, being a highly viscous substance.

In testimony whereof I have hereunto set my hand.

ERNST TEUPEL. [L. S.]